United States Patent [19]

Okuda et al.

[11] Patent Number: 5,482,544
[45] Date of Patent: Jan. 9, 1996

[54] RUST-PREVENTIVE COMPOSITION

[75] Inventors: Masaaki Okuda, Takarazuka; Hajime Kondo, Osaka; Eiji Fujiwara, Amagasaki, all of Japan

[73] Assignee: Tayca Corporation, Osaka, Japan

[21] Appl. No.: 275,153

[22] Filed: Jul. 14, 1994

[30]     Foreign Application Priority Data

Jul. 15, 1993   [JP]   Japan .................................... 5-198948

[51] Int. Cl.$^6$ ................................. C09D 5/08; C09D 1/00
[52] U.S. Cl. .................................... 106/14.12; 106/14.05; 106/14.39; 106/14.44
[58] Field of Search ............................... 106/14.05, 14.12, 106/14.44, 443, 436, 450, 401, 286.1, 287.29, 14.39

[56]              References Cited

U.S. PATENT DOCUMENTS

| | | | |
|---|---|---|---|
| 3,892,577 | 7/1975 | Sugahara et al. | 106/14.12 |
| 4,966,630 | 10/1990 | Okuda | 106/14.12 |
| 5,030,285 | 7/1991 | Vallvey et al. | 106/14.12 |
| 5,137,567 | 8/1992 | Vallvey et al. | 106/14.12 |

FOREIGN PATENT DOCUMENTS

| | | | |
|---|---|---|---|
| 0389653A1 | 10/1990 | European Pat. Off. . | |
| 55-116768 | 9/1980 | Japan | 106/14.12 |
| 55-160059 | 12/1980 | Japan . | |
| 57-007806 | 1/1982 | Japan | 106/14.12 |
| 62-169872 | 7/1987 | Japan | 106/14.12 |
| 64-36665 | 2/1989 | Japan | 106/14.12 |
| 3-146567 | 6/1991 | Japan | 106/14.05 |
| 4-243908 | 1/1992 | Japan . | |

OTHER PUBLICATIONS

*Chemical Abstracts*, vol. 119, No. 16, Abstract No. 162472 (1993).

V. Lyutsko et al., *Russian Journal of Organic Chemistry*, 30(7):1023–1027 (1985).

*Primary Examiner*—Anthony Green
*Attorney, Agent, or Firm*—David G. Conlin; Peter F. Corless

[57]              ABSTRACT

The disclosure describes a rust-preventive composition comprising a layered phosphate whose active hydrogen is reacted with ammonia in an amount of 20 to 80 mol % based on the total amount of hydrogen of the layered phosphate, and an amphoteric or basic oxide, a ratio by weight of the layered phosphate to the amphoteric or basic oxide being 10:1 to 1:10.

5 Claims, No Drawings

RUST-PREVENTIVE COMPOSITION

BACKGROUND OF THE INVENTION

The present invention relates to a rust-preventive composition. More particularly it relates to a rust-preventive composition which is free of the pollution problem, has excellent rust-preventive property and also shows excellent storage stability even when blended in aqueous paints which are expected to grow in demand in future with strengthened legal regulations on use of VOC (volatile organic compounds) and the increasing global interests in the environmental problems.

Hitherto, as rust-preventives, there have been used lead-based pigments such as red lead, lead suboxide, lead cyanamide, calcium plumbate, basic lead sulfate and basic lead chromate; chrome pigments such as zinc chromate, strontium chromate, barium chromate and calcium chromate; phosphate pigments such as zinc phosphate, calcium phosphate, aluminum phosphate, titanium phosphate, phosphites and hypophosphites; molybdate pigments such as zinc molybdate, calcium molybdate, and zinc phosphomolybdate; and borate pigments such as barium metaborate.

In recent years, however, antipollution regulations on use of heavy metal elements such as lead and chromium have been strengthened, and accordingly demand for pollution-free phosphoric acid-based rust-preventives has risen sharply. Especially the rust-preventive compositions comprising aluminum dihydrogen triphosphate, which is a layered phosphate, have excellent rust-preventive performance and are popularly used as a pollution-free rust-preventive containing no heavy metal in various types of paints and coatings such as solvent (non-aqueous) type, aqueous and powder type (Japanese Patent Application Laid-Open (KOKAI) No. 55-160059 (1980)).

However, the rust-preventives comprising the layered phosphate such as aluminum dihydrogen triphosphate have the problem that when they are used for an aqueous paint, storage stability and/or rust-preventive property of the paint may be deteriorated.

Therefore, the rust-preventive compositions blended with the layered phosphate are required to be modified in formulation for improving storage stability of the aqueous paints comprising such compositions. With the technical trend of solvents from the organic type to the aqueous type due to regulations on use of VOC, demand is rising for the development of a rust-preventive composition which shows excellent storage stability when formulated in an aqueous paint.

As a result of extensive studies by the present inventors, it has been found that by using a layered phosphate reacted with ammonia, the obtained composition exhibits excellent storage stability even when formulated in an aqueous paint and also has excellent rust-preventive property. The present invention has been attained on the basis of this finding.

SUMMARY OF THE INVENTION

An object of the present invention is to provide a rust-preventive composition containing a layered phosphate, which composition shows excellent storage stability even when formulated in an aqueous paint and also has excellent rust-preventive property.

It is also an object of the present invention to provide a paint or coating which is excellent in both storage stability and rust-preventive properties.

In a first aspect of the present invention, there is provided a rust-preventive composition comprising a layered phosphate whose active hydrogen is reacted with ammonia in an amount of 20 to 80 mol % based on the total amount of hydrogen of the layered phosphate, and an amphoteric or basic oxide, a ratio by weight of the layered phosphate to the amphoteric or basic oxide being 10:1 to 1:10.

In a second aspect of the present invention, there is provided a paint containing a rust-preventive composition and a coating resin, the rust-preventive composition comprising a layered phosphate whose active hydrogen is reacted with ammonia of an amount of 20 to 80 mol % based on the total amount of active hydrogen of the layered phosphate, and an amphoteric or basic oxide, a ratio by weight of the layered phosphate to the amphoteric or basic oxide being 10:1 to 1:10.

DETAILED DESCRIPTION OF THE INVENTION

The layered phosphates usable in the present invention include, for instance, aluminum dihydrogen triphosphate [$AlH_2P_3O_{10} \cdot nH_2O$ (n=0 or 2)], titanium phosphate [$Ti(HPO_4)_2 \cdot nH_2O$ (n=1 or 2)], zirconium phosphate [$Zr(HPO_4)_2 \cdot nH_2O$ (n=1 or 2)] and cerium phosphate [$Ce(HPO_4)_2 \cdot nH_2O$ (n=1.33 or 2)].

These layered phosphates have active hydrogen atoms, and it is known that they can be reacted with various kinds of basic substances and can have the guest molecules intercalated between the layers.

The present invention is mainly characterized by use of a layered phosphate reacted with ammonia. When the layered phosphate is reacted with other basic substance than ammonia, such as methylamine, ethylamine, diethylamine, triethylamine, sodium hydroxide, potassium hydroxide or the like, the obtained composition can not satisfy both requirements for storage stability when formulated in an aqueous paint and rust-preventive property at the same time.

Regarding the reaction of ammonia with a layered phosphate, Russian Journal of Inorganic Chemistry 30 (7) 1985, pp. 1023–1027, discloses vapor phase reaction of ammonia with active hydrogen in aluminum dihydrogen triphosphate. The reference also discloses reaction of active hydrogen in aluminum dihydrogen triphosphate with ammonia by passing a saturated solution of ammonium chloride through a column containing aluminum dihydrogen triphosphate.

Also, Japanese Patent Application Laid-Open (KOKAI) No. 4-243908 (1992) teaches intercalation of silver ions as a silver-ammine complex by forming the complex by ammonia ions, when introducing silver ions into a layered phosphate.

Either vapor phase reaction or wet reaction can be employed for obtaining a layered phosphate whose active hydrogen is reacted with ammonia, which is used in the present invention.

In the case of vapor phase reaction, there can be employed, for instance, the method disclosed in the above-mentioned Russian Journal of Inorganic Chemistry 30 (7) 1985, pp. 1023–1027, which comprises flowing ammonia gas into a closed vessel containing a layered phosphate, the feed of ammonia gas being stopped at the point when not less than 20 mol % of the total amount of active hydrogen of the layered phosphate (not including hydrogen in crystal water) has been reacted with ammonia.

In the case of wet reaction, active hydrogen of the layered phosphate is reacted with ammonia in a solvent such as water, ethanol, benzene or the like.

It can be determined by X-ray diffractometry or CHN elemental analysis whether ammonia has been introduced into the reaction product or not. According to the X-ray diffractometry, the interlaminar distance of the layered phosphate is measured to determine whether ammonia has been introduced between the layers of the layered phosphate. According to the CHN elemental analysis, the amount of ammonia introduced between the layers of the layered phosphate (the amount of ammonia reacted with active hydrogen) can be determined.

The amount of ammonia reacted with active hydrogen of the layered phosphate is 20 to 80 mol % based on the total amount of active hydrogen of the original layered phosphate (not including hydrogen in crystal water). When the amount of ammonia reacted with active hydrogen is less than 20 mol % based on the total amount of hydrogen of the layered phosphate, the obtained composition is not improved in storage stability to a satisfactory degree when formulated in an aqueous paint. When the amount of ammonia reacted with active hydrogen exceeds 80 mol % based on the total amount of hydrogen of the layered phosphate, the obtained composition deteriorates in rust-preventive properties. The amount of ammonia reacted with active hydrogen of the layered phosphate is preferably about 30 to 50 mol % based on the total amount of hydrogen of the layered phosphate.

Usually several to several thousand hours are required for the acid-base reaction, but coexistence of water with ammonia gas promotes the reaction, allowing completion of the reaction in only about 60 minutes.

In the present invention, the layered phosphate whose active hydrogen is partly reacted with ammonia constitutes the principal component that exhibits the rust-preventive action. It is not definitely known, however, why a layered phosphate, whose active hydrogen is reacted with ammonia, can show excellent storage stability even when formulated in an aqueous paint while maintaining excellent rust-preventive property. It is considered that when active hydrogen is reacted with ammonia, the compatibility of the phosphate with aqueous resin is improved and the factors of lowering of denseness of the coat, such as gelation of resin, are greatly reduced, resulting in improvement of not only storage stability as a paint but also rust-preventive property evaluated as coating films.

In the present invention, an amphoteric or basic oxide is used in combination with the layered phosphate whose active hydrogen is partly reacted with ammonia. The layered phosphate has the nature of a sort of solid acid and when it is used in the form as it is, it may make the coating film acidic to reduce the rust-preventive effect or the phosphate may be eluted excessively to cause blistering of the coating film, resulting in a reduced rust-preventive effect. Use of an amphoteric or basic oxide in combination with the layered phosphate allows the coating film to maintain neutrality and also makes the coating film dense or compact to render it resistant to blistering. Thus the rust-preventive effect of the composition is enhanced.

Typical examples of the amphoteric or basic oxides usable in the present invention are zinc oxide and oxides or hydroxides of alkaline earth metals. Examples of the oxides or hydroxides of alkaline earth metals usable in the present invention include magnesium oxide, magnesium hydroxide, magnesium carbonate, calcium oxide, calcium hydroxide and calcium carbonate. In the present invention, such amphoteric or basic oxide is preferably selected from zinc oxide, magnesium oxide and calcium hydroxide. These compounds need not be special ones; those commonly applied to industrial uses can be used.

In the rust-preventive composition of the present invention, the ratio by weight of the layered phosphate whose active hydrogen is partly reacted with ammonia to the amphoteric or basic oxide is preferably 1:10 to 10:1, more preferably 10:1 to 10:10.

When the ratio of the layered phosphate is below the above-defined range, the obtained composition may be low in rust-preventive performance and also may deteriorate in storage stability as aqueous paints. When the ratio exceeds the above range, since the water solubles in the rust-preventive composition increase, blistering tends to take place in the finished coating to reduce the rust-preventive effect.

In the preparation of the rust-preventive composition according to the present invention, mixing of a layered phosphate whose active hydrogen is partly reacted with ammonia and an amphoteric or basic oxide may be accomplished by either dry mixing or wet mixing. In case the rust-preventive composition needs to be dispersed in a resin with poor stability in producing a paint, it is recommended to previously subject the component materials to wet mixing for carrying out a wet reaction.

The wet reaction may be either batchwise or continuous, and the order of mixing of the Component materials to be added in the reaction is optional. The wet reaction is preferably carried out at a temperature in the range from room temperature to 80° C. for a period of usually 30 minutes to 3 hours. The resultant reaction slurry is filtered, dried and ground to give the objective rust-preventive composition.

The wet reaction is described more particularly below by showing a preferred process thereof.

First, an aqueous slurry of a layered phosphate adjusted to an appropriate temperature within the range from room temperature to 80° C. is prepared. To this slurry is added a compound which releases into the slurry the ammonium ions of an amount equivalent to 20 to 80 mol % of the total amount of active hydrogen of the layered phosphate (not including hydrogen in crystal water). As the compound, there can be used, for example, ammonium hydroxide, ammonium phosphate, ammonium sulfate, ammonium carbonate and the like. Of these compounds, ammonium hydroxide is preferred. The reaction is continued for about 0.5 to 3 hours in the slurry.

Then an amphoteric or basic oxide is added in a ratio by weight of 10:1 to 1:10, to the layered phosphate whose active hydrogen is partly reacted with ammonia, and the mixture is stirred for 0.5 to 3 hours while maintaining the temperature within the range from room temperature to 80° C. Thereafter, the slurry is dehydrated, filtered, dried and ground. In the above process, the slurry temperature is maintained within the range from room temperature to 80° C. simply because a low reaction temperature necessitates a long reaction time. This, therefore, does not specifically restrict the reaction conditions in the present invention.

In the above wet reaction process, the order of addition of the reactants may be reversed. That is, there may be first prepared a slurry of an amphoteric or basic oxide whose ratio by weight to the layered phosphate is 10:1 to 1:10, and while maintaining the temperature of the slurry within the range from room temperature to 80° C., a layered phosphate is added thereto and stirred for 0.5 to 3 hours. Then an ammonium ion source is added in an amount equivalent to 20 to 80 mol % of the total amount of hydrogen of the layered phosphate for carrying out reaction for 0.5 to 3 hours. The resultant slurry is dehydrated, filtered, dried and ground to give the objective rust-preventive composition.

The rust-preventive composition of the present invention shows excellent storage stability when formulated in an aqueous paint, but if desired the composition may be formulated in a non-aqueous paint or coating. In the latter case, the composition provides an improvement of rust-preventive performance of the paint or coating.

For preparation of an aqueous paint, the rust-preventive composition is mixed and dispersed in a paint composed of an aqueous resin such as water-soluble resin, dispersion resin, emulsion resin (including those for cationic and anionic electrodeposition coating) or the like and water. In the case of non-aqueous paint, ordinary coating resins or the like can be used, which include boiled oil, oil varnish, various types of synthetic resins for coating such as phenol resins, amino resins, epoxy resins, urethane resins, vinyl resins, acrylic resins, fluorine resins, silicon resins and polyester resins, rubber derivatives such as chlorinated rubber and cyclized rubber, and cellulose derivatives. These materials may be used either singly or as a mixture. As for the solvent, one suited to the coating resin used may be used as required.

When dispersing the rust-preventive composition of the present invention in a coating resin, it is not always required to previously mix a layered phosphate whose active hydrogen is partly reacted with ammonia and an amphoteric or basic oxide. They may be separately added into the coating resin and mixed with each other in the resin.

The paint or coating material containing the rust-preventive composition of the present invention may contain the additives usually used in the paints, such as dispersant, wetting agent, defoaming agent, thickening agent, film-former auxiliary, etc.

The aqueous paints containing the rust-preventive composition of the present invention have excellent storage stability. Namely, they suffer no notable change of viscosity even when left at 40° C. for more than one month.

In a test of rust-preventing effect, according to ASTM D610-68 (1970), of the coating containing the rust-preventive composition of the present invention, the area where rusting has started can be less than 0.1%, and in a test of blister-preventing effect according to ASTM D714-56 (1974), the degree of blistering in the coating can be not more than 8F.

EXAMPLES

The present invention is further illustrated below with reference to the examples thereof, which examples however are merely intended to be illustrative and not limit the scope of the invention. In the following Examples, all "parts" indicating the amount and "%" indicating the concentration are by weight basis unless otherwise noted.

EXAMPLE 1

1 g of aluminum dihydrogen triphosphate was put into a desiccator filled with ammonia to have its partial pressure of 350 mmHg, and after 460-hour standing, the desiccator was evacuated by a vacuum pump until the weight of aluminum dihydrogen triphosphate became constant for removing ammonia adsorbed on the product. There was thus obtained aluminum dihydrogen triphosphate whose active hydrogen was partly reacted with ammonia.

Then an aqueous slurry was prepared with 10 parts of the aluminum dihydrogen triphosphate whose active hydrogen was partly reacted with ammonia, and 30 parts of deionized water and heated to 80° C. 6 parts of zinc oxide was added to this slurry and stirred for about one hour with the temperature maintained at 80° C. The resultant slurry was dehydrated, filtered, dried at 100° C. for 16 hours and then ground to give a rust-preventive composition. The amount of ammonia reacted with active hydrogen was 70 mol % based on the total amount of active hydrogen of aluminum dihydrogen triphosphate (not including hydrogen in crystal water).

EXAMPLE 2

A vessel containing ammonia water was placed in a desiccator, and 1 g of aluminum dihydrogen triphosphate was left on the vessel. Partial pressure of ammonia in the desiccator was 350 mmHg, and partial pressure of water was 10 mmHg. About 30 minutes later, the vessel of ammonia water was removed and the desiccator was evacuated by a vacuum pump until the weight of aluminum dihydrogen triphosphate reacted with ammonia became constant for removing ammonia and water adsorbed on the surface of the product. In this way, there was obtained aluminum dihydrogen triphosphate whose active hydrogen was partly reacted with ammonia.

10 parts of the aluminum dihydrogen triphosphate whose active hydrogen was partly reacted with ammonia, and 4 parts of zinc oxide were dry-mixed to obtain a rust-preventive composition. The amount of ammonia reacted with active hydrogen in the manner described above was 74 mol % based on the total amount of active hydrogen of aluminum dihydrogen triphosphate (not including hydrogen in crystal water).

EXAMPLE 3

150 g of zinc oxide was added to 1,000 g of deionized water to prepare a zinc oxide slurry. This slurry was heated to about 50° C. and then 300 g of aluminum dihydrogen triphosphate was added thereto, followed by a wet treatment at about 50° C. for 2 hours.

To this slurry was added 40 g of 28% ammonia water, and the reaction was carried out for one hour. The resultant slurry was dehydrated, filtered, dried at 100° C. for 12 hours and ground to give a rust-preventive composition. The amount of ammonia reacted with active hydrogen in the manner described above was 35 mol % based on the total amount of active hydrogen of aluminum dihydrogen triphosphate (not including hydrogen in crystal water).

EXAMPLE 4

200 g of magnesium oxide was added to 1,000 g of deionized water to prepare a magnesium oxide slurry. This slurry was heated to about 50° C., then 300 g of aluminum dihydrogen triphosphate was added thereto, and the mixture was subjected to a wet treatment at about 50° C.

To this slurry was added 40 g of 28% ammonia water, and the reaction was carried out for one hour. The resultant slurry was dehydrated, filtered, dried at 100° C. for 12 hours and ground to give a rust-preventive composition. The amount of ammonia reacted with active hydrogen in the manner described above was 35 mol % based on the total amount of active hydrogen of aluminum dihydrogen triphosphate (not including hydrogen in crystal water).

EXAMPLE 5

120 g of calcium hydroxide was added to 1,000 g of deionized water to prepare a calcium hydroxide slurry. This slurry was heated to about 50° C., then 300 g of aluminum dihydrogen triphosphate was added thereto, and the mixture was subjected to a wet treatment at about 50° C. for 2 hours.

To this slurry was added 40 g of 28% ammonia water, and the reaction was carried out for one hour. The resultant slurry was dehydrated, filtered, dried at 100° C. for 12 hours and ground to give a rust-preventive composition. The amount of ammonia reacted with active hydrogen in the manner described above was 35 mol % based on the total amount of active hydrogen of aluminum dihydrogen triphosphate (not including hydrogen in crystal water).

EXAMPLE 6

23.5 g of $ZrOCl_2$, which is a water-soluble zirconium salt, was dissolved in 500 ml of deionized water, and to this solution was added dropwise 46.1 g of 85% phosphoric acid with stirring ($P_2O_5/ZrO_2$ molar ratio=1.5). The resultantly obtained white gel-like precipitate was centrifuged, followed by addition of 85% phosphoric acid and mixing in a crucible. The crucible containing the mixture was placed in an electric furnace set at 130° C., and the steam heated to 130° C. was blown around the crucible. The reaction of the mixture was carried out in the presence of steam at 130° C. for 4 hours.

The reaction product had white color. This reaction product was washed with water, dehydrated, dried and ground. X-ray diffraction of the ground product identified it as zirconium phosphate $[Zr(HPO_4)_2 \cdot H_2O]$. The interlaminar distance of this zirconium phosphate was 7.6 Å (0.76 nm).

60 g of zinc oxide was added to 1,000 g of deionized water to prepare a zinc oxide slurry, and to this slurry, after heated to about 50° C., was added 100 g of the zirconium phosphate and the mixture was subjected to a wet treatment at about 50° C. for 2 hours.

30 g of 28% ammonia water was added to the resultant slurry and reacted for one hour. Then the slurry was dehydrated, filtered, dried at 100° C. for 12 hours and ground to give a rust-preventive composition. The amount of ammonia reacted with active hydrogen in the manner described above was. 74 mol % based on the total amount of active hydrogen of zirconium phosphate (not including hydrogen in crystal water).

EXAMPLE 7

11.6 g of titanium hydroxide $[Ti(OH)_4]$ and 34.6 g of 85% phosphoric acid ($P_2O_5/TiO_2$ molar ratio=1.5) were mixed well by stirring in a porcelain crucible in the same way as Example 4. The crucible containing the mixture was placed in an electric furnace set at 110° C. and the steam heated to 110 was blown around the crucible. The reaction of titanium hydroxide and phosphoric acid was carried out in the presence of steam at 110° C. for 5 hours.

The reaction product had white color. This reaction product was washed with water, dehydrated, dried and ground. The ground product was identified as titanium phosphate $[Ti(HPO_4)_2 \cdot H_2O]$ by X-ray diffraction. The interlaminar distance of this titanium phosphate was 7.6 Å.

130 g of thus obtained titanium phosphate was mixed with 400 g of deionized water to form a slurry. 35 g of 28% ammonia water was added to the slurry and the mixture was heated to about 60° C. and reacted for about one hour.

Then 60 g of zinc oxide was added to the slurry, followed by an about one-hour wet treatment. The resultant slurry was dehydrated, filtered, dried at 100° C. for 16 hours and ground to obtain a rust-preventive composition. The amount of ammonia reacted with active hydrogen in the manner described above was 58 mol % based on the total amount of active hydrogen of titanium phosphate (not including hydrogen in crystal water).

EXAMPLE 8

19.5 g of commercial cerium oxide (special grade 99% $CeO_2$) and 31.2 g of 85% phosphoric acid ($P_2O_5/CeO_2$ molar ratio=1.2) were mixed well by stirring in a porcelain crucible. The crucible containing the mixture was placed in an electric furnace set at 180° C. and the steam heated to 180° C. was blown around the crucible. The reaction of cerium oxide and phosphoric acid was carried out in the presence of steam at 180° C. for 4 hours.

The reaction product had light yellow color. This reaction product was washed with water, dehydrated, dried and ground. X-ray diffraction of the ground product identified it as cerium phosphate $[Ce(HPO_4)_2 \cdot 1.33H_2O]$. The interlaminar distance of this cerium phosphate was 15.9 Å.

330 g of thus obtained cerium phosphate was mixed with 400 g of deionized water to form a slurry, and 50 g of 28% ammonia water was added to the slurry, heated to about 60 and reacted for about one hour.

Then 80 g of zinc oxide was added to the slurry, followed by a wet treatment for about one hour. The resultant slurry was dehydrated, filtered, dried at 100° C. for 16 hours and ground to give a rust-preventive composition. The amount of ammonia reacted with active hydrogen in the manner described above was 45 mol % based on the total amount of active hydrogen of cerium phosphate (not including hydrogen in crystal water).

EXAMPLE 9

The same procedure as in Example 3 was carried out except for use of 60 g of ammonium primary phosphate in place of 40 g of 28% ammonia water to obtain a rust-preventive composition. In Example 9, the amount of ammonia reacted with active hydrogen was 28 mol % based on the total amount of active hydrogen of aluminum dihydrogen triphosphate (not including hydrogen in crystal water).

COMPARATIVE EXAMPLE 1

A vessel containing ammonia water was placed in a desiccator, and 1 g of aluminum dihydrogen triphosphate was left on the vessel. The partial pressure of ammonia in the desiccator was 350 mmHg, and the partial pressure of water was 10 mmHg.

About one hour later, the vessel of ammonia water was removed, and the desiccator was evacuated by a vacuum pump until the weight of aluminum dihydrogen triphosphate reacted with ammonia became constant for removing ammonia and water adsorbed on the surface of the product. There was thus obtained aluminum dihydrogen triphosphate whose active hydrogen was partly reacted with ammonia. The amount of ammonia reacted with active hydrogen in the manner described above was 70 mol % based on the total amount of active hydrogen of aluminum dihydrogen triphosphate (not including hydrogen in crystal water). The thus obtained aluminum dihydrogen triphosphate was ground and used as a pigment composition.

COMPARATIVE EXAMPLE 2

The same procedure as in Example 3 was followed except that 28% ammonia water was used in an amount of 15 g, instead of 40 g, to obtain a pigment composition. In this example, the amount of ammonia reacted with active hydrogen was 13 mol % based on the total amount of active hydrogen of aluminum dihydrogen triphosphate (not including hydrogen in crystal water).

COMPARATIVE EXAMPLE 3

The same procedure as in Example 3 was followed except that 28% ammonia water was used in an amount of 110 g, instead of 40 g, to obtain a pigment composition. In this example, the amount of ammonia reacted with active hydrogen was 96 mol % based on the total amount of active hydrogen of aluminum dihydrogen triphosphate (not including hydrogen in crystal water).

COMPARATIVE EXAMPLE 4

The same procedure as in Example 3 was followed except that 123 g of 40% methylamine was used in place of 40 g of 28% ammonia water to obtain a pigment composition.

COMPARATIVE EXAMPLE 5

The same procedure as in Example 3 was followed except that 101 g of 70% ethylamine was used in place of 40 g of 28% ammonia water to obtain a pigment composition.

COMPARATIVE EXAMPLE 6

The same procedure as in Example 3 was followed except that 115 g of 100% ethylamine was used in place of 40 g of 28% ammonia water to obtain a pigment composition.

COMPARATIVE EXAMPLE 7

The same procedure as in Example 3 was followed except that 14 g of 100% triethylamine was used in place of 40 g of 28% ammonia water to obtain a pigment composition.

COMPARATIVE EXAMPLE 8

The same procedure as in Example 3 was followed except that 64 g of 4N sodium hydroxide was used in place of 40 g of 28% ammonia water to obtain a pigment composition.

COMPARATIVE EXAMPLE 9

The same procedure as in Example 7 was followed except that 750 ml of 0.1N ethylenediamine was used in place of 35 g of 28% ammonia water to obtain a pigment composition.

COMPARATIVE EXAMPLE 10

5 g of aluminum dihydrogen triphosphate was added to 100 ml of a 0.1N benzene solution of butylamine and stirred to prepare a slurry, and an ultrasonic wave was applied to this slurry for 5 hours. The oscillating frequency of this ultrasonic wave was 28 kHz and the treating temperature was 25° C.

After this ultrasonic wave treatment, the slurry was dehydrated, filtered, dried at 100° C. for 16 hours and ground to obtain aluminum dihydrogen triphosphate containing butylamine between the layers. 100 parts of this aluminum dihydrogen triphosphate and 20 g of magnesium oxide were dry mixed to give a pigment composition.

COMPARATIVE EXAMPLE 11

The same procedure as in Comparative Example 10 was followed except for use of octylamine in place of butylamine, to obtain aluminum dihydrogen triphosphate containing octylamine between the layers. 100 parts of this aluminum dihydrogen triphosphate and 40 parts of calcium hydroxide were dry mixed to give a pigment composition.

The interlaminar distance of the original aluminum dihydrogen triphosphate used in Examples 1 to 5 and 9 and its interlaminar distance after partial reaction of active hydrogen with ammonia (hereinafter referred to as "interlaminar distance after reaction"), the interlaminar distance of the original zirconium phosphate used in Example 6 and its interlaminar distance after reaction, the interlaminar distance of the original titanium phosphate used in Example 7 and its interlaminar distance after reaction, and the interlaminar distance of the original cerium phosphate used in Example 8 and its interlaminar distance after reaction are shown in Table 1.

TABLE 1

| | | Interlaminar distance (Å) | |
|---|---|---|---|
| | | Original | After reaction |
| Example 1 | Aluminum dihydrogen triphosphate | 7.9 | 8.8 |
| Example 2 | Aluminum dihydrogen triphosphate | 7.9 | 8.8 |
| Example 3 | Aluminum dihydrogen triphosphate | 7.9 | 7.8 |
| Example 4 | Aluminum dihydrogen triphosphate | 7.9 | 8.0 |
| Example 5 | Aluminum dihydrogen triphosphate | 7.9 | 8.1 |
| Example 6 | Zirconium phosphate | 7.6 | 8.8 |
| Example 7 | Titanium phosphate | 7.6 | 7.7 |
| Example 8 | Cerium phosphate | 16.1 | 13.5 |
| Example 9 | Aluminum dihydrogen triphosphate | 7.9 | 7.9 |

The air-drying type emulsion resin paints were prepared by using the rust-preventive compositions of Examples 1 to 9 and the pigment compositions of Comparative Examples 1 to 9 described above, and the coating films were formed with these paints and subjected to a salt spray test and a storage stability test. The results are shown in Test Example 1. In Test Example 1, for the sake of comparison, there were prepared the air-drying type emulsion resin paints by using K-White #84S (trade name of a rust-preventive containing aluminum dihydrogen triphosphate with its active hydrogen not reacted with ammonia, produced by Tayca Corp.), zinc phosphate and strontium chromate as rust-preventives, and these paints were subjected to the same test.

There were also prepared the air-drying type medium-oil alkyd resin paints by using the rust-preventive compositions of Examples 1 to 9 and the pigment compositions of Comparative Examples 1 to 11, and they were subjected to the salt spray test to examine their rust-preventive effect. The results are shown in Test Example 2. In Test Example 2, for the sake of comparison, there were prepared the air-drying type medium-oil alkyl resin paints by using K-White #84S (mentioned above), zinc phosphate and strontium chromate, and they were subjected to the same test.

TEST EXAMPLE 1

The air-drying type emulsion resin paints of the formulations shown in Table 2 were prepared, and the coating films were formed with these paints and subjected to the salt spray test and the storage stability test.

1-1 Preparation of Rust-Preventive Paint 21 kinds of air-drying emulsion resin paints were prepared with the formulations shown in Table 2

TABLE 2

| Component | (part) | Amount |
|---|---|---|
| Grinds | Pigment *1 | 10.0 |
| | Water | 14.3 |
| | Methylcarbitol | 23.1 |
| | Tamol 165 (21%) *2 | 3.3 |
| | Triton CF-10 *3 | 0.4 |
| | Nopco DF-122NS *4 | 1.1 |
| | Acrysol RM-1020 (20%) *5 | 8.1 |
| | Red iron oxide | 23.1 |
| | Precipitated calcium carbonate | 60.0 |
| Letdown | Maincote HG-54 *6 | 236.6 |
| | Texanol *7 | 6.0 |
| | Dibutyl phthalate | 6.0 |
| | Nopco DF-122NS | 1.4 |
| | 28% Ammonia water | 1.6 |
| | 15% Sodium nitrite solution | 3.0 |
| | Water | 10.8 |
| | Total | 408.8 |

*1: Type of pigment
 1: Rust-preventive composition of Example 1
 2: Rust-preventive composition of Example 2
 3: Rust-preventive composition of Example 3
 4: Rust-preventive composition of Example 4
 5: Rust-preventive composition of Example 5
 6: Rust-preventive composition of Example 6
 7: Rust-preventive composition of Example 7
 8: Rust-preventive composition of Example 8
 9: Rust-preventive composition of Example 9
 10: Pigment composition of Comparative Example 1
 11: Pigment composition of Comparative Example 2
 12: Pigment composition of Comparative Example 3
 13: Pigment composition of Comparative Example 4
 14: Pigment composition of Comparative Example 5
 15: Pigment composition of Comparative Example 6
 16: Pigment composition of Comparative Example 7
 17: Pigment composition of Comparative Example 8
 18: Pigment composition of Comparative Example 9
 19: K-White #84S (trade name)
 20: Zinc phosphate
 21: Strontium chromate
*2: Trade name of a dispersant produced by Rohm & Haas.
*3: Trade name of a wetting agent produced by Rohm & Haas.
*4: Trade name of a defoaming agent produced by Sun Nopco.
*5: Trade name of a thickening agent produced by Rohm & Haas.
*6: Trade name of an acryl emulsion produced by Rohm & Haas.
*7: Trade name of a film-former auxiliary produced by Chisso Corp.

1-2 Coating and Coating Conditions

Each of the above 21 kinds of air-drying resin paints was coated on a plate under the following conditions and dried at ambient temperature to form a coating film.

Coating Conditions

Coating method: bar coating
Plate coated: degreased soft steel plate JIS G 3141 (SPCC-SB), produced by Nippon Test Panel Industrial Co., Ltd.
Coating thickness: 38–41 μm
Drying: 40° C., 60 hours

1-3 Salt Spray Test

The test plates prepared by forming coating films on the steel plates in the manner described above were placed in a salt spray tester kept at 35° C. A 5% sodium chloride solution was sprayed to the coating films at a rate of 1 $kg/cm^2$ over a period of 10 days and the degree of rusting on the test plates and blistering of the coating films were observed.

1-4 Salt Spray Test Results

The results of the above salt spray test for the respective types of rust-preventives are shown in Table 3.

The rust-preventive effect was evaluated in terms of rust preventing effect on the test plate and blister preventing effect in the coating film according to the following criteria of evaluation. The criterion of evaluation of rust preventing effect conforms to ASTM D610-68 (1970) and the criterion of evaluation of blister preventing effect conforms to ASTM D714-56 (1974). As is apparent from the following criteria of evaluation, the higher the rating value, the better the rust and blister preventing effect.

Criterion of Evaluation of Rust Preventing Effect

5: Rusted area is less than 0.1%.
4: Rusted area is 0.1% to less than 1%.
3: Rusted area is 1% to less than 10%.
2: Rusted area is 10% to less than 33%.
1: Rusted area is 33% or over.

Criterion of Evaluation of Blister Preventing Effect

5: 8F, No blister
4: 8M, 6F
3: 8MD, 6M, 4F
2: 8D, 6MD, 4M, 2F
1: 6D, over 4MD, over 2M

TABLE 3

| | Rust-preventing effect | Blister-preventing effect |
|---|---|---|
| Rust-preventive composition of Example 1 | 5 | 5 |
| Rust-preventive composition of Example 2 | 5 | 5 |
| Rust-preventive composition of Example 3 | 5 | 5 |
| Rust-preventive composition of Example 4 | 5 | 5 |
| Rust-preventive composition of Example 5 | 5 | 5 |
| Rust-preventive composition of Example 6 | 5 | 5 |
| Rust-preventive composition of Example 7 | 5 | 5 |
| Rust-preventive composition of Example 8 | 5 | 5 |
| Rust-preventive composition of Example 9 | 5 | 5 |
| Pigment composition of Comparative Example 1 | 3 | 2 |
| Pigment composition of Comparative Example 2 | 3 | 3 |

TABLE 3-continued

| | Rust-preventing effect | Blister-preventing effect |
|---|---|---|
| Pigment composition of Comparative Example 3 | 2 | 2 |
| Pigment composition of Comparative Example 4 | 2 | 1 |
| Pigment composition of Comparative Example 5 | 2 | 2 |
| Pigment composition of Comparative Example 6 | 2 | 1 |
| Pigment composition of Comparative Example 7 | 2 | 1 |
| Pigment composition of Comparative Example 8 | 2 | 2 |
| Pigment composition of Comparative Example 9 | 2 | 2 |
| K-White #84S | 5 | 5 |
| Zinc phosphate | 3 | 2 |
| Strontium chromate | 5 | 5 |

1-5 Paint Storage Stability Test

The rust-preventive paints containing the rust-preventives were prepared according to the above-shown formulations. These rust-preventive paints were left in a 40° C. thermostat and the viscosity of each paint was measured by a Brookfield type viscometer periodically at intervals of one week over a period of about one month.

1-6 Paint Storage Stability Test Results

The storage stability test results are shown in Table 4.

The smaller the change with time of viscosity, the better. When the change of viscosity is large, the paint may be gelled and become unusable. The unit of the figures in Table 4 is cps.

TABLE 4

| | Initial | After 1 week | After 3 week | After 5 week |
|---|---|---|---|---|
| Example 1 | 3600 | 3700 | 3400 | 3500 |
| Example 2 | 2800 | 3000 | 2900 | 3100 |
| Example 3 | 3400 | 3300 | 3000 | 3200 |
| Example 4 | 3200 | 3200 | 3100 | 3000 |
| Example 5 | 3200 | 3400 | 3300 | 3100 |
| Example 6 | 3000 | 3200 | 2800 | 3200 |
| Example 7 | 2800 | 3000 | 3000 | 3200 |
| Example 8 | 3200 | 3000 | 3200 | 3400 |
| Example 9 | 2800 | 2800 | 3000 | 3000 |
| Comparative Example 1 | 2500 | 2800 | 3100 | 2900 |
| Comparative Example 2 | 2300 | 4500 | Gelled | Gelled |
| Comparative Example 3 | 2800 | 3000 | 3200 | 3000 |
| Comparative Example 4 | 2800 | 3000 | 3200 | 3000 |
| Comparative Example 5 | 2900 | 3300 | 2700 | 3100 |
| Comparative Example 6 | 3200 | 3300 | 3100 | 3000 |
| Comparative Example 7 | Gelled | Gelled | Gelled | Gelled |
| Comparative Example 8 | 3000 | 3500 | 2800 | 3500 |
| Comparative Example 9 | 3200 | 3100 | 3300 | 3600 |
| K-White #84S | 2200 | more than 100000 | Gelled | Gelled |
| Zinc phosphate | 3400 | 3200 | 2900 | 2900 |
| Strontium chromate | 3000 | 2800 | 2800 | 3000 |

As is seen from Table 3, the rust-preventive compositions of Examples 1 to 9 had high rating for both rust and blister preventive effects. Also, as shown in Table 4, the rust-preventive compositions of Examples 1 to 9 were small in increase of viscosity during storage, indicating excellent storage stability in aqueous paints.

On the other hand, the pigment compositions of Comparative Examples 1 to 9 were all low in rust-preventive effect, and some paints produced by using these compositions were poor in storage stability. K-White #84S, which is one of the commercial rust-preventive containing aluminum dihydrogen triphosphate whose active hydrogen is not reacted with ammonia, showed good rust-preventive effect but was poor in paint storage stability, while zinc phosphate showed good paint storage stability but was poor in rust-preventive effect.

Strontium chromate is excellent in both rust-preventive effect and paint storage stability, but it involves the problems about safety as it contains hexavalent chromium.

In contrast, the rust-preventive compositions of Examples 1 to 9 according to the present invention are pollution-free and have no safety problem, and further, as is seen from Tables 3 and 4, they have excellent rust-preventive property and storage stability in aqueous paints equal to strontium chromate.

TEST EXAMPLE 2

There were prepared 23 kinds of the air-drying type medium-oil alkyd resin paints of the formulations shown in Table 5, and the coatings were formed with these paints and subjected to the salt spray test to examine their rust-preventive effect.

2-1 Preparation of Rust-Preventive Paint 23 kinds of air-drying medium-oil alkyd resin paints were prepared with the formulations shown in Table 5.

TABLE 5

| Component | Amount (part) |
|---|---|
| Pigment *8 | 5.8 |
| Precipitated barium sulfate | 9.7 |
| Talc SSS | 7.5 |
| Ocher | 5.8 |
| Beckosol 1334EL *9 | 57.4 |
| 6% Cobalt naphthenate | 0.3 |
| 24% Lead naphthenate | 0.7 |
| Disparlon 501 *10 | 0.3 |
| Disparlon 4200-20 *11 | 1.0 |
| Paint thinner *12 | 11.5 |
| Total | 100.0 |

*8: Type of pigment
1: Rust-preventive composition of Example 1
2: Rust-preventive composition of Example 2
3: Rust-preventive composition of Example 3
4: Rust-preventive composition of Example 4
5: Rust-preventive composition of Example 5
6: Rust-preventive composition of Example 6
7: Rust-preventive composition of Example 7
8: Rust-preventive composition of Example 8
9: Rust-preventive composition of Example 9
10: Pigment composition of Comp. Example 1
11: Pigment composition of Comp. Example 2
12: Pigment composition of Comp. Example 3
13: Pigment composition of Comp. Example 4
14: Pigment composition of Comp. Example 5
15: Pigment composition of Comp. Example 6
16: Pigment composition of Comp. Example 7
17: Pigment composition of Comp. Example 8
18: Pigment composition of Comp. Example 9
19: Pigment composition of Comp. Example 10
20: Pigment composition of Comp. Example 11
21: K-White #84S (trade name)
22: Zinc phosphate
23: Strontium chromate
*9: Trade name of an air-drying type medium-oil alkyd resin

TABLE 5-continued solution with a solid concentration of 50%, produced by Dai-Nippon Ink Chemical Industry Co., Ltd.
*10: Trade name of a polyester resin-based anti-skinning agent produced by Kusumoto Kasei KK.
*11: Anti-settling agent produced by Kusumoto Kasei KK.
*12: Paint thinner produced by Kansai Paint Co., Ltd.

2-2 Coating and Coating Conditions

Each of the above-described 23 kinds of air-drying medium-oil alkyd resin paints was coated on a plate and dried at ambient temperature to form a coating film.
Coating method: bar coating
Plate coated: A degreased soft steel plate JIS G 3141 (SPCC-SB), produced by Nippon Test Panel Industrial Co., Ltd.
Coating thickness: 30–32 μm
Drying: at room temperature for one week

2-3 Salt Spray Test

The test plates prepared by forming coating films on the steel plates in the manner described above were placed in a salt spray tester kept at 35° C., and a 5% sodium chloride solution was sprayed to the plates at a rate of 1 kg/cm² for 14 days. Thereafter, rusting on the test plates and blistering of the coating films were observed.

2-4 Salt Spray Test Results

The salt spray test results are shown in Table 6 in terms of 5-point-system rating of rust preventive effect and blister preventive effect of each type of rust-preventive composition. The rust-preventive effect evaluation method was the same as used in Test Example 1.

TABLE 6

|  | Rust-preventing effect | Blister-preventing effect |
|---|---|---|
| Rust-preventive composition of Example 1 | 5 | 5 |
| Rust-preventive composition of Example 2 | 5 | 5 |
| Rust-preventive composition of Example 3 | 5 | 5 |
| Rust-preventive composition of Example 4 | 5 | 5 |
| Rust-preventive composition of Example 5 | 5 | 5 |
| Rust-preventive composition of Example 6 | 5 | 5 |
| Rust-preventive composition of Example 7 | 5 | 5 |
| Rust-preventive composition of Example 8 | 5 | 5 |
| Rust-preventive composition of Example 9 | 5 | 5 |
| Pigment composition of Comparative Example 1 | 3 | 2 |
| Pigment composition of Comparative Example 2 | 3 | 3 |
| Pigment composition of Comparative Example 3 | 2 | 2 |
| Pigment composition of Comparative Example 4 | 2 | 2 |
| Pigment composition of Comparative Example 5 | 2 | 2 |
| Pigment composition of Comparative Example 6 | 2 | 2 |
| Pigment composition of Comparative Example 7 | 2 | 2 |
| Pigment composition of Comparative Example 8 | 2 | 1 |
| Pigment composition of Comparative Example 9 | 2 | 2 |
| Pigment composition of Comparative Example 10 | 2 | 1 |
| Pigment composition of Comparative Example 11 | 2 | 1 |
| K-White #84S | 3 | 3 |
| Zinc phosphate | 2 | 2 |
| Strontium chromate | 5 | 4 |

As is seen from Table 6, the rust-preventive compositions of Examples 1 to 9 had high rating in both rust preventive effect and blister preventive effect. Their rust-preventive effect was far better than those of zinc phosphate, a conventional pollution-free rust-preventive, and K-White #84S (a rust-preventive comprising aluminum dihydrogen triphosphate with its active hydrogen not reacted with ammonia) and was equal to or even better than the effect of strontium chromate. Thus, the rust-preventive compositions of Examples 1 to 9 according to the present invention showed excellent rust-preventive performance in solvent type paints, too.

What is claimed is:

1. A rust-preventive composition comprising a layered phosphate having an active hydrogen reacted with ammonia in an amount of 20 to 80 mol % based on the total amount of hydrogen of the layered phosphate, and an amphoteric or basic oxygen-containing compound selected from the group consisting of zinc oxide, and oxides, hydroxides, and carbonates of alkali earth metals, a ratio by weight of the layered phosphate to the amphoteric or basic oxygen-containing compound being 10:1 to 1:10.

2. A rust-preventive composition according to claim 1, wherein the layered phosphate is aluminum dihydrogen triphosphate, titanium phosphate, zirconium phosphate or cerium phosphate.

3. A rust-preventive composition according to claim 1, wherein the amphoteric or basic oxygen-containing compound is zinc oxide, magnesium oxide or calcium hydroxide.

4. A rust-preventive composition according to claim 1, wherein the ratio by weight of the layered phosphate to the amphoteric or basic oxygen-containing compound is 10:1 to 10:10.

5. A paint containing a rust-preventive effective amount of a rust-preventive composition and a water-based or solvent-based coating resin, the rust-preventive composition comprising a layered phosphate having an active hydrogen reacted with ammonia in an amount of 20 to 80 mol % based on the total amount of active hydrogen of the layered phosphate, and an amphoteric or basic oxygen-containing compound selected from the group consisting of zinc oxide, and oxides, hydroxides, and carbonates of alkali earth metals, a ratio by weight of the layered phosphate to the amphoteric or basic oxygen-containing compound being 10:1 to 1:10.

* * * * *